June 7, 1927.

C. FROESCH 1,631,196

FLEXIBLE COUPLING

Filed Nov. 5, 1925

INVENTOR
CHARLES FROESCH

BY
Redding, Greeley, O'Shea + Campbell
his ATTORNEYS

Patented June 7, 1927.

1,631,196

UNITED STATES PATENT OFFICE.

CHARLES FROESCH, OF NEW YORK, N. Y., ASSIGNOR TO INTERNATIONAL MOTOR COMPANY, OF NEW YORK, N. Y., A CORPORATION OF DELAWARE.

FLEXIBLE COUPLING.

Application filed November 5, 1925. Serial No. 66,925.

This invention relates primarily to flexible couplings or torque cushioning devices adapted to be operatively interposed between two elements capable of rotation whereby the torque of one such element may be impressed upon the other with provision for relative displacement between the rotating elements. The invention has for one of its objects to provide a torque cushioning device between driving and driven shafts, for instance, whereby the effect of the relative displacement between the respective shafts may be availed of to return the shafts to normal relative position. To this end devices are availed of to store up reactive forces during the displacement of the respective shafts which, upon being released, tend to restore the shafts to normal position. More particularly yielding non-metallic resilient material is carried with one of the shafts and is adapted to carry a cam surface and the other shaft is adapted to carry an element capable of traveling over the cam upon relative displacement of the shafts to effect the compression of the yielding non-metallic resilient material whereby when the tendency toward displacement disappears the tendency of the yielding non-metallic resilient material to return to normal form effects the return of the device. The invention will be found not only applicable in situations where what are commonly termed flexible couplings are utilized but may also be availed of as differential gearing between the propeller shaft, for instance, and the axle sections in a vehicle. In order that the invention may be clearly understood and readily carried into effect the same will now be described more fully with reference to the accompanying drawings illustrating a preferred embodiment thereof, in which:

Figure 1:
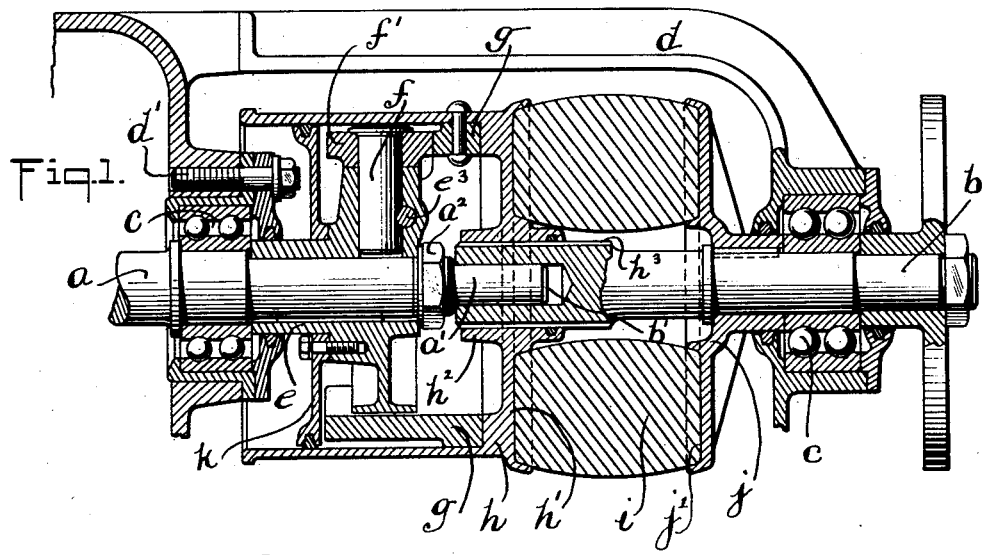
Figure 1 is a longitudinal sectional view showing the torque cushioning device according to the present invention taken in the planes indicated in the broken line A, B in Figure 3 and looking in the direction of the arrows.

Referring to the drawings a driving or transmission shaft is indicated at $a$ and a driven or propeller shaft is indicated at $b$. Both these shafts are supported in bearings $c$ carried in a housing or frame $d$. A fork $e$ is secured to the shaft $a$ as by the key $e'$ and carries pins $f$ diametrically disposed within a radial recess $e^2$. Bolts $e^3$ secure pins $f$ against rotation within the fork. Rotatably mounted upon the pins $f$ are rollers $f'$ and these rollers are adapted to engage a cam $g$ secured as by rivets to a housing $h$ open at one end and formed at its opposite end with a seat $h'$ for an annulus of yielding non-metallic material $i$. The hub $h^2$ of this housing is splined as at $h^3$ and is capable of reciprocation on the driven shaft $b$. Keyed to the driven shaft is another seat member or flange $j$ having seats $j'$ also adapted to engage the annulus $i$.

Bearings $c$ may serve as thrust bearings which may be secured as by the bolts $d'$ to the frame $d$ which, in connection with motor vehicles, may be bolted to the transmission housing. Thus by means of the thrust bearings $c$ the forces induced while transmitting torque are adequately resisted. The mechanical elements of the device may be adequately lubricated by providing a supply of lubricant in the housing $h$ which serves to seal the non-metallic annulus $i$ from the lubricant. To prevent the escape of the lubricant a disc $k$ may be removably secured to the fork $e$ as shown in Figure 1. The shafts may be centered by reducing the diameter of one shaft as at $a'$ and disposing it within a recess $b'$ formed in the other shaft. Such reduced end $a'$ may be advantageously formed as a separate element removably secured to the shaft $a$ as by the nut $a^2$.

Figures 2, 3:
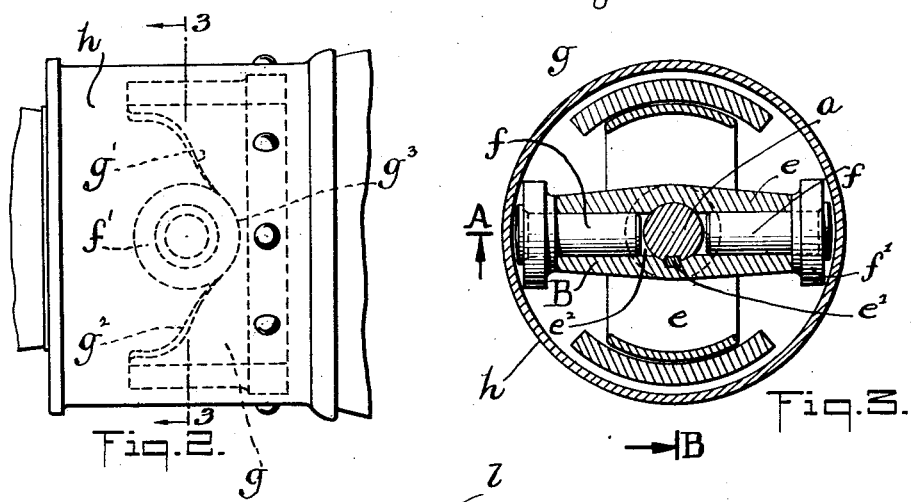
Figure 2 is a fragmentary view looking from above in Figure 1 and showing the cam surface carried by the yielding non-metallic material and a roller adapted to travel over the cam.
Figure 3 is a transverse sectional view taken in the plane indicated by the line 3—3 in Figure 2 and looking in the direction of the arrows and showing the rollers and cam surfaces according to the present invention.

It will be noted from an inspection of Figures 2 and 3 that there are two diametrically disposed cam surfaces $g$ adapted to be traveled over by the rollers $f'$ or the cam may be described as circular, formed with two symmetrical shapes for the action of the roller indicated, respectively, at $g'$, $g^2$ in Figure 2, the roller being adapted to travel over one of the cams say, $g^2$ when the rotation of the shaft is say clockwise when looking from the right and the other cam surface $g'$ being adapted to be traveled over by the roller when the shafts are rotating in a counterclockwise direction.

Figure 4:
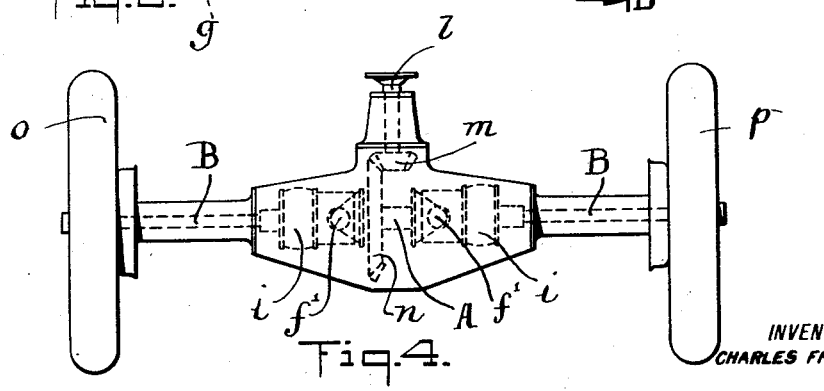
Figure 4 is a view showing one application of the invention to the driving axles of a motor vehicle.

Upon rotation of the shaft $a$ the rollers will climb on the cam surface until the horizontal component of the driving force will equal the rubber compression due to the provision for reciprocation of the housing $h$ with respect to the shaft $b$ at which time both the driving and driven shafts will rotate at the same speed. It can be readily seen that the cam contour can be varied to obtain any desired difference of shafts angularity for a predetermined compression of the rubber. Figure 2 illustrates a situation in which the rollers are disposed within the recess $g^3$ at the center of the cam outline which is the position of rest and ordinary running once the shafts have been set in motion, since, as the speed of rotation of the two shafts approach one another, the expansion of the rubber will tend to return the roller to its extreme position in the lowermost part $g^3$. Furthermore, the driving torque which is maximum at the beginning of rotation decreases until a position of equilibrium between the compression of the non-metallic resilient material and the horizontal component of the driving force on the cam is reached. This position is such that the rollers come to rest on seat $g^3$ of cam $g'$ under normal running conditions. In Figure 4 there is illustrated the adaptation of the device according to the present invention to a rear axle design for motor vehicles in lieu of the mechanical differential gear at present used. The drive is transmitted from a propeller shaft section $l$ through the conventional bevel gears or dual reduction type of gear ($m$, $n$,) and a torsion cushioning means according to the present invention is disposed on each side of the driving gear $n$, the driving shaft being indicated at A and the driven shafts at B, B, respectively. By the construction disclosed it is possible to obtain a differentiation between the wheels $o$, $p$, of about 120°, or more depending upon the ratio of initial compression of the rubber, the maximum allowable compressive stress of the rubber and contour of cam $g'$.

It will thus be seen that a torque cushioning device has been provided for interposition between two rotatable elements whereby the rotation of one element is translated into force in an axial direction through the instrumentality of the cam and roller mechanism and a non-metallic cushion or the equivalent is provided to yieldingly resist such axial force and upon cessation thereof to return the parts to their normal relative positions.

Various modifications may be made in the combination and composition of the respective elements going to make up the torque cushioning means according to the present invention. For instance, the yielding non-metallic cushion $i$ may be replaced by rubber balls, a spring or the like, and a screw and nut readily replace the actuating cam and levers.

What I claim is:

1. In a torque cushioning device, in combination with a driving and a driven shaft, a cam surface carried with one of the shafts, means to permit reciprocation of said cam surface with respect to said shaft, a roller carried with the other shaft and engageable with said cam surface, and means comprising yielding non-metallic material to yieldingly maintain said cam surface in engagement with the roller.

2. In a torque cushioning device, in combination with a driving and a driven shaft, a fork carried with one of the shafts formed with diametrically disposed axial recesses, pins carried in said recesses, respectively, rollers carried with said pins, respectively, cam surfaces carried with the other shaft, means to permit said cam surfaces to move axially of said shaft in either direction, and yielding non-metallic material carried with the last named shaft and maintaining said cam surfaces in engagement with the rollers.

3. In a drive for motor vehicles, the combination with the propeller shaft and live axle sections, of a shaft parallel to said live axle sections, power transmission devices between the propeller shaft and said last named shaft, cam surfaces carried reciprocably with the live axle sections, means carried with the parallel shaft to engage said cam surfaces, and yielding means comprising yielding non-metallic material carried with the live axle sections and maintaining said cam surfaces in engagement with the cam engaging means.

This specification signed this 22nd day of October, A. D. 1925.

CHARLES FROESCH